Feb. 18, 1969 W. GERLACH 3,428,874

CONTROLLABLE SEMICONDUCTOR RECTIFIER UNIT

Filed May 16, 1966

Inventor:
Willi Gerlach
By: Spencer & Kaye
Attorneys

United States Patent Office 3,428,874
Patented Feb. 18, 1969

3,428,874

CONTROLLABLE SEMICONDUCTOR RECTIFIER UNIT

Willi Gerlach, Frankfurt am Main, Eschersheim, Germany, assignor to Licentia Patent-Verwaltungs-G.m.b.H., Frankfurt, Germany Filed May 16, 1966, Ser. No. 550,361
Claims priority, application Germany, May 14, 1965, L 50,706
U.S. Cl. 317—235 8 Claims
Int. Cl. H01l *11/00*

ABSTRACT OF THE DISCLOSURE

In a controllable semiconductor rectifier composed of a semiconductor body having four successive zones of alternately opposite conductivity types and a further zone having the same conductivity type and disposed on the same side of the body as one of the outermost of the successive zones, and a load having one end ohmically connected to the one outermost zone, means for decreasing the switching time of the thyristor including at least one auxiliary electrode ohmically connected to the further zone and at least one impedance element having one end connected to a respective auxiliary electrode and its other end connected to the other side of the load.

The present invention relates to the field of semiconductors, and particularly to the controllable semiconductor rectifiers of the type constituted by four semiconductor zones having alternately different conductivity types.

A controllable semiconductor rectifier generally includes for example, a silicon body containing four layers having alternately different conductivity types. Each of the two outer layers is provided with an electrode and is considered to be either an anode or a cathode, depending on the manner in which the device is connected into the circuit. A third electrode is connected to one of the two inner layers and serves for initiating conduction through the rectifier, this electrode being referred to as the "control electrode." The control electrode is normally positioned on the same side of the semiconductor body as the cathode. These elements have recently become generally identified as "thyristors," mainly because they exhibit a current voltage characteristic which is similar to that of the thyratron.

While the known forms of thyristors perform well for many purposes, their turn-on time has been found to be too long for some applications.

The control electrode for initiating conduction in a thyristor generally contacts only a small surface area of the layer to which it is connected, and is disposed in the region either of the periphery or of the center of the cathode or anode surface.

In operation, immediately after the application of a turn-on voltage to the control electrode, conduction begins in the semiconductor rectifier only in a narrowly limited zone directly adjacent the control electrode. The cross-sectional area over which conduction occurs then expends at a rate of about 0.1 mm. per microsecond. The main electrode nearest the control electrode injects current electrons substantially only into the region nearest the control electrode as a result of the fact that the control current produces a voltage drop along the path resistance of the base layer nearest the control electrode; this voltage drop will cause a sharp decrease in the injected current level as the distance from the center of the electron injection zone increases due to the exponential relation between forward current and forward voltage. As a result, conduction initially begins in the rectifier only in this small zone.

Thereafter, charge carriers diffuse in a lateral direction from this region of high charge carrier concentration into the non-conducting regions so as to initiate conduction therein. In this manner, the current carrying area and the region occupied by charge carriers will be propagated in a gradual manner across the entire surface of the pnpn structure. The relatively small propagation velocity of about 0.1 mm. per microsecond has the result, particularly in the larger area thyristors, that conduction will never occur across more than a portion of the thyristor cross section when the device is operating with high frequency signals or with pulses having a relatively short duration. When the thyristor operates in this manner, the current-carrying region thereof will be subjected to high thermal stresses which will lead to the possible destruction of the device. In order to avoid this danger it is necessary that such thyristors be operated with a reduced upper frequency limit.

It is possible to increase this propagation velocity of the current-carrying cross section without impairing the other properties of the thyristor by providing several control electrodes which are connected in parallel so as to produce a simultaneously initiation of conduction. For example, the total turn-on time of the thyristor may be halved by disposing two control electrodes opposite each other at the periphery of the thyristor and by connecting these electrodes together in parallel so that they produce a simultaneous initiation of current. However, the provision of two control electrodes connected in parallel necessitates a doubling of the control power. A further multiplication of the number of control electrodes requires a comparable multiplication of the control power. It will be appreciated that this represents a considerable increase in power dissipation, particularly in the case of power thyristors.

It is a primary object of the present invention to eliminate these drawbacks and difficulties.

Another object of the present invention is to decrease the turn-on time of thyristors.

A further object of the present invention is to increase the upper frequency limit of power thyristors.

Yet another object of the present invention is to eliminate the above difficulties and drawbacks without substantially increasing the control power requirements.

These and other objects according to the present invention are achieved by the provision of a controllable semiconductor rectifier unit including a semiconductor body having four successive zones of alternately opposite conductivity types, and means for connecting at least one of the outermost of these zones to a load circuit. In accordance with a particular novel feature of the present invention, the unit further includes an auxiliary electrode connected to the semiconductor body, and impedance means having one end connected to the electrode and its other end connectable to the load circuit. In further accordance with the present invention, the unit further includes a load circuit connected at least to one of the outermost zones of the semiconductor body and to the above-mentioned other end of the impedance.

In accordance with a more specific feature of the present invention, the auxiliary electrode is positioned on the same side of the body as one of the outermost zones, and the body is provided with a further zone having the same conductivity type as this one outermost zone and having the auxiliary electrode connected thereto.

The provision of an auxiliary electrode has the advantage of permitting conduction to be initiated at several locations without requiring any additional control power to be supplied. Moreover, as will be described in greater detail below, it has been found to be particularly advantageous to connect the auxiliary electrode to a semiconductor zone which is disposed on the same side of the semiconductor body, and which has the same conductivity type as one of the rectifier zones to which a main rectifier electrode is connected. This main rectifier electrode may be either the cathode or the anode for the unit, depending on the manner in which the unit is connected into a particular circuit.

Additional objects and advantages of the present invention will become apparent upon consideration of the following description when taken in conjunction with the accompanying drawings in which:

FIGURE 1 is an elevational, cross-sectional view of a first embodiment of the present invention.

FIGURE 1*a* is a cross-sectional plan view taken along the plane defined by the line 1*a*—1*a* of FIGURE 1.

In the drawings, identical elements have been identified by the same reference numerals.

Figures 1, 1A, 2, 3, 4:
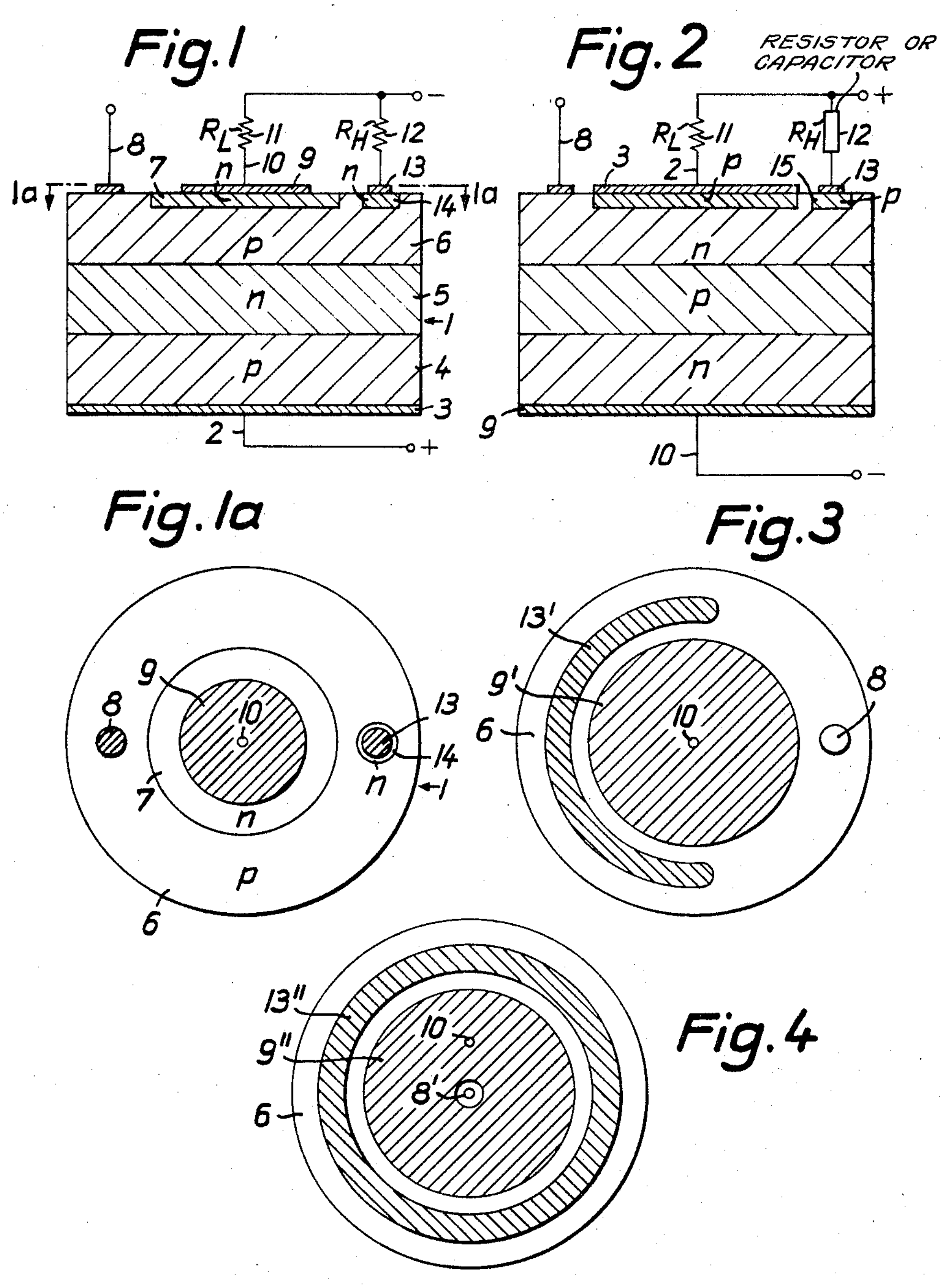
FIGURE 2 is a view similar to that of FIGURE 1 of another embodiment according to the present invention.
FIGURE 3 is a view similar to that of FIGURE 1*a* of a further embodiment of the present invention.
FIGURE 4 is a view similar to that of FIGURE 1*a* of yet another embodiment of the present invention.

Referring now to FIGURES 1 and 1*a* together, there is shown a thyristor 1 provided with an anode connection 2 which is conductively connected to anode electrode 3. The semiconductor body of the thyristor is constituted by layers 4 and 6 of p-type conductivity and alternating layers 5 and 7 of n-type conductivity. The layer 4 is sometimes referred to as a p-emitter and the layer 7 is sometimes referred to as an n-emitter, while the layers 5 and 6 are often referred to as n- and p-bases, respectively. Layer 4 makes ohmic contact with anode electrode 3, while layer 7 makes ohmic contact with a cathode contact 9 which is conductively connected to a cathode lead 10.

There is also provided a control electrode 8 which makes ohmic contact with the p-conductive layer 6.

The semiconductor body is also provided with a zone 14 of n-type conductivity which is disposed in layer 6, and adjacent layer 7, zone 14 thus having the same conductivity type as layer 7. A load resistance 11 which is also identified as $R_L$, has one end connected to cathode lead 10, while an additional impedance 12, also identified as $R_H$, has one end connected to auxiliary electrode 13 and the other end connected to the other end of resistance 11. Impedance 12 can thus be considered to be connected in a parallel manner with resistance 11.

As is shown in FIGURE 1, the auxiliary electrode provided according to the present invention must be physically separated from that main electrode which is disposed on the same side of the rectifier. In addition, the impedance 12 connected to the auxiliary electrode must be connected in a parallel manner with the load resistance 11 and is preferably chosen to have an impedance which is larger than the resistance of load resistance 11 by about one order of magnitude. Impedance 12 is most generally constituted by a resistor.

In the operation of the arrangement of FIGURES 1 and 1*a*, conduction is initiated in the rectifier by supplying a suitable control current to electrode 8. At the moment when this control current is applied, conduction initially begins in thyristor 1 only in the region adjacent electrode 8. The initial current flow produces a voltage drop across load resistance 11 which acts to give cathode electrode 9 a positive bias with respect to zone 14. This bias causes the portion of the pn junction between layers 6 and 7 in the region nearest zone 14 to be reverse biased and the pn junction between layer 6 and zone 14 to be forward biased. When the voltage drop across load resistor 11 increases to a predetermined value, the blocking voltage across the above-mentioned portion of the pn junction between layers 6 and 7 reaches its reverse breakdown value. In power thyristors, this voltage is in the range of 10 to 30 volts.

This causes a hole current to be produced in the resulting space-charge zone by impact ionization. The hole current then flows into the p-base 6 and forces the pn junction 6–14 to inject electrons into base 6, thereby causing conduction to be initiated in the pnpn arrangement composed of regions 4, 5, 6 and 14.

The value of impedance 12 is chosen to be sufficiently high to limit the current flowing through this latter arrangement to negligible value in comparison with the load current level. The current through the auxiliary current path defined by this arrangement will therefore reach a final steady state value in a very short time. As a result, the voltage drop across resistor 12 will increase at a faster rate than that across resistance 11.

Because the voltage drop across resistor 12 increases at this faster rate, a point will be reached at which the voltage drop across resistor 12 exceeds that across resistor 11. When this occurs, the polarity of the voltage between the contacts 9 and 13 will reverse and the auxiliary electrode 13 will become positive with respect to the cathode electrode 9. As a result, there will be produced in the p-base 6 a transverse drift field which is directed toward cathode electrode 9 and which has an associated hole current. This hole current will act to induce the pn junction 6–7 to inject an electron current and thus to initiate conduction.

The time delay of current initiation at the edge near the control electrode has a value of approximately twice the delay time of the thyristor itself. This latter delay time is of the order of 1 to 3 microseconds. In comparison, the entire process of expanding the area over which current conduction takes place requires approximately 140 to 200 microseconds to attain a surface area of about 14 mm. diameter under normal conditions. The time delay occurring during the auxiliary current initiation is inconsequential in comparison thereto so that the provision of this auxiliary current initiation will have the effect of reducing by half the time required for enlarging the current conduction cross section to the size set forth above.

In accordance with another feature of the present invention, several auxiliary electrodes may be provided and one or more of these auxiliary electrodes may be electrically connected to the main load circuit by way of one or more resistances. Such an arrangement will have the advantageous effect of further reducing the thyristor turn-on time. The use of a plurality of auxiliary electrodes is not accompanied by any increase in the required control power since the additional power for these auxiliary electrodes is taken directly from the load circuit.

Since current flows through the auxiliary circuit for the short time required for the initiation of current conduction at the thyristor cathode, it is also possible according to the present invention to constitute the impedance 12 by a capacitor. In typical embodiments of the present invention, such a capacitor may have a capacitance of the order of 0.1 microfarad.

When several auxiliary electrodes are used, it is also possible, according to the present invention to connect resistors to some of these electrodes and capacitors to the remaining ones thereof.

It is also possible to construct thyristor arrangements according to the present invention in which the polarity of each of the semiconductor zones is reversed. Such an arrangement is shown in FIGURE 2 in which the cathode 9 is connected to the lowermost semiconductor zone and the anode 3 is connected to the uppermost zone and is disposed on the same side of the arrangement as the control electrode 8 and the auxiliary electrode 13. In this embodiment, auxiliary electrode 13 is connected to a zone 15 of p-type conductivity. It will be readily appreciated that this arrangement functions in substantially the same manner as that of FIGURE 1.

While the embodiments of FIGURES 1 and 2 are shown to be provided with an auxiliary electrode having a small, circular configuration, it is also possible, according to the present invention, to employ a wide variety of geometric shapes for the auxiliary electrode and to vary the relative position of this electrode with respect to the control electrode. For example, the auxiliary electrode can be provided in the form of a ring and can be arranged to surround the control electrode. The auxiliary electrode can also have a semicircular configuration or can be constituted by a plurality of relatively small electrodes each similar to the electrode 13 shown in FIGURES 1 and 2, which are arranged on the surface of the semiconductor body to surround the control electrode.

As is also the case for the embodiments of FIGURES 1 and 2, it has been found particularly advantageous to dispose both the auxiliary electrode and the control electrode on the same side of the semiconductor body and to dispose that main electrode which is on the same side of the body between the latter two electrodes.

FIGURE 3 illustrates one modified form of construction wherein the auxiliary electrode 13' has a semicircular configuration and is disposed diametrically opposite the control electrode 8. Electrode 8 contacts the p-type layer 6, in the case of an embodiment similar to that of FIGURE 1, or a similar n-type conductive layer, in the case of an embodiment similar to that of FIGURE 2. In addition, the arrangement is provided with a main electrode 9' which is co-extensive with the semiconductor layer to which it is connected. Electrode 9' is provided with a centrally arranged lead 10.

This configuration for the auxiliary electrode 13' produces the advantageous result of causing conduction to be simultaneously initiated across a relatively large portion of the semiconductor layer to which electrode 9' is connected.

An arrangement for enhancing this effect is shown in FIGURE 4 wherein the auxiliary electrode 13'' is in the form of a closed ring which surrounds the main electrode 9''. Electrode 9'' is provided with a lead 10 and in turn encloses a control electrode 8' connected to semiconductor layer 6. It will be appreciated that this form of construction can also be applied equally well to the arrangement of FIGURE 2.

It will be understood that the above description of the present invention is susceptible to various changes, modifications, and adaptations, and the same are intended to be comprehended within the meaning and range of equivalents of the appended claims.

What is claimed is:

1. A controllable semiconductor rectifier unit comprising, in combination:

(a) a semiconductor body having four successive zones of alternately opposite conductivity types and a further zone having the same conductivity type, and disposed on the same side of said body, as one of the outermost of said successive zones;

(b) means for connecting at least said one of the outermost of said zones to one side of a load circuit;

(c) at least one auxiliary electrode connected to said further zone;

(d) at least one impedance element having one end connected to a respective auxiliary electrode and its other end connectable to the other side of such load; and (e) a load circuit connected between said one of said outermost zones and said other end of said impedance element.

2. An arrangement as defined in claim 1 wherein said auxiliary electrode is spaced from said one outermost zone.

3. An arrangement as defined in claim 1 wherein said load circuit is resistive and the absolute value of the impedance presented by said impedance element is at least one order of magnitude greater than the resistance of said load circuit.

4. An arrangement as defined in claim 1 wherein at least one said impedance element is constituted by a resistor.

5. An arrangement as defined in claim 1 wherein at least one said impedance element is constituted by a capacitor.

6. An arrangement as defined in claim 1 further comprising a control electrode disposed on the same surface of said body as said auxiliary electrode, and wherein said auxiliary electrode is in the form of a ring and is disposed to surround both said one outermost zone and said control electrode.

7. An arrangement as defined in claim 1 wherein said auxiliary electrode has a semicircular configuration and is arranged to partially surround said one outermost zone.

8. An arrangement as defined in claim 1 further comprising a control electrode disposed on the same surface of said semiconductor body as said auxiliary electrode, and wherein said control electrode and said auxiliary electrode are disposed to respectively opposite sides of said one outermost zone.

References Cited

UNITED STATES PATENTS 3,256,470 6/1966 Gerlach ............ 317—235

FOREIGN PATENTS 233,119 9/1963 Austria.
702,279 1/1965 Canada.
713,733 7/1965 Canada.

JOHN W. HUCKERT, *Primary Examiner.*

J. D. CRAIG, *Assistant Examiner.*

U.S. Cl. X.R.

307—299